US012440951B2

(12) United States Patent
Lin et al.

(10) Patent No.: US 12,440,951 B2
(45) Date of Patent: Oct. 14, 2025

(54) APPARATUS FOR INSTALLING EXPLOSIVELY DRIVEN FASTENERS

(71) Applicants: Joe Lin, Missouri City, TX (US); Brian Liu, Houston, TX (US)

(72) Inventors: Joe Lin, Missouri City, TX (US); Brian Liu, Houston, TX (US)

(73) Assignee: NITROSET, LLC, Houston, TX (US)

( * ) Notice: Subject to any disclaimer, the term of this patent is extended or adjusted under 35 U.S.C. 154(b) by 61 days.

(21) Appl. No.: 18/139,724

(22) Filed: Apr. 26, 2023

(65) Prior Publication Data

US 2024/0359303 A1 Oct. 31, 2024

(51) Int. Cl.
*B25C 1/12* (2006.01)
*B25C 1/18* (2006.01)

(52) U.S. Cl.
CPC ................ *B25C 1/12* (2013.01); *B25C 1/188* (2013.01)

(58) Field of Classification Search
CPC .. B25C 1/12; B25C 1/123; B25C 1/18; B25C 1/188
USPC ............................................................ 227/9
See application file for complete search history.

(56) References Cited

U.S. PATENT DOCUMENTS 2,669,716 A * 2/1954 Catlin .................... B25C 1/188 227/8
3,370,770 A * 2/1968 Henning .................. B25C 1/10 227/9
3,468,465 A * 9/1969 Mulno .................... B25C 1/143 227/10
3,589,584 A * 6/1971 Ohlsson .................... B25C 1/18 227/10
3,690,536 A * 9/1972 Bakoledis ............... B25C 1/143 227/10
4,358,041 A * 11/1982 Ollivier ..................... B25C 1/14 227/9
4,655,380 A * 4/1987 Haytayan ................ B25F 5/021 227/9
5,904,284 A * 5/1999 Lin ......................... B25C 1/082 227/8
2008/0302846 A1* 12/2008 Thompson .............. B25C 1/186 411/441
2011/0198382 A1* 8/2011 Masas ....................... B25C 1/12 411/440
2011/0198383 A1* 8/2011 Masas ..................... F16B 19/14 227/156
2012/0000960 A1* 1/2012 Masas ....................... B25C 1/12 227/9
2012/0321413 A1* 12/2012 Masas ..................... F16B 19/14 411/440
2020/0139527 A1* 5/2020 Lin ....................... F16B 5/0685
(Continued)

*Primary Examiner* — Joshua G Kotis
(74) *Attorney, Agent, or Firm* — John R Casperson

(57) ABSTRACT

A spring tool for actuating explosive fasteners for driving nails into a substrate is disclosed. For the tool to operate at its maximum potential the firing pin guide should be pushed securely against the rear of the fastener and the tip of the fastener should be pushed securely against the substrate. The action of the operator pushing the tool forward to actuate the tool moves the trigger body forward while compressing the firing spring until the trigger body travels the exact distance needed to release the trigger ball. The trigger body must also be in optimal rotational orientation with the tool and means for accomplishing the alignment is disclosed.

14 Claims, 13 Drawing Sheets

(56) References Cited

U.S. PATENT DOCUMENTS

| | | | | |
|---|---|---|---|---|
| 2021/0260740 | A1* | 8/2021 | Lin | B25C 1/085 |
| 2022/0219304 | A1* | 7/2022 | Lin | B25C 1/008 |

* cited by examiner

APPARATUS FOR INSTALLING EXPLOSIVELY DRIVEN FASTENERS

FIELD OF THE INVENTION

This invention relates broadly to explosively driven fasteners. More particularly, this invention relates to an apparatus for installing explosively driven fasteners.

BACKGROUND OF THE INVENTION

For applying explosively driven fasteners to a substrate, power charges and nail lengths are all individually optimized for a given application. It would be desirable to optimize the tool to match.

OBJECTS OF THE INVENTION

It is an object of this invention to provide a spring energized tool for applying explosively driven fasteners that has a positive stop and is not springy when fully energized.

SUMMARY OF THE INVENTION

Preferred embodiments of the invention provide tools for installing an explosively driven fastener, the fastener including a nail and an explosive load attached to the nail.

The tool comprises an outer cover sleeve defining a bore, a longitudinal axis, a proximal end and a distal end. A generally tubular trigger body is fixedly positioned in the outer cover sleeve. The bore of the trigger body has a distally facing arcuate backstop face.

An end cap is positioned at the proximal end of the trigger body securing the trigger body to the outer cover sleeve.

A firing pin holder is located within the bore of the generally tubular trigger body and extends along the longitudinal axis of the trigger body. The firing pin holder has a proximal end and a distal end.

A firing spring is arranged to bias the firing pin holder distally with respect to the trigger body.

A firing pin is provided having a proximal end and a distal end. The distal end is pointed. The firing pin is separate from the firing pin holder. The proximal end of the firing pin is removably coupled to the distal end of the firing pin holder.

A nosepiece is provided having a proximal end and a distal end. The proximal end is arranged to receive a firing pin guide and the distal end is arranged to receive the fastener comprising the nail and the explosive load such that when the fastener is placed in the distal end of the nosepiece and the firing pin holder is biased out of the outer cover sleeve by the firing spring, the firing pin strikes the explosive load causing the explosive load to explode and drive the nail out of the nosepiece.

A tubular reset sleeve is provided having an inner annular face facing distally and an outer annular face facing proximally.

The firing pin guide is carried slidably in the reset sleeve. The firing pin guide has a distal end and a proximal end, a proximally facing outer arcuate face abuttable against the inner arcuate face of the reset sleeve, and an arcuate face at its proximal end abuttable against the inside distally facing arcuate backstop face in the generally tubular trigger body.

A reset spring is mounted around the firing pin guide and abuts the outer arcuate face of the reset sleeve. The reset spring biases the reset sleeve distally.

A trigger ball and a trigger ball spring are mounted transversely in the firing pin holder. The trigger ball is biased radially outward from within the firing pin holder.

The firing pin guide has a slot extending from the proximal end and a widened area in the slot to receive the trigger ball.

When the tool is in an energized position, the trigger ball rests in the widened area of the slot thereby limiting distal movement of the firing pin, and the arcuate end face of the firing pin guide abuts or nearly abuts the arcuate backstop face in the trigger body.

For the tool to operate at its maximum potential the firing pin guide should be pushed securely against the rear of the fastener and the tip of the fastener should be pushed securely against the substrate and the trigger body should be in the proper rotational orientation in the outer cover.

The action of the operator pushing the tool forward to actuate the tool moves the trigger body forward while compressing the firing spring until the trigger body travels the exact distance needed to release the trigger ball.

A step or backstop insert is added to the inside of the trigger body. The step is designed such that at the exact distance where the trigger ball is released, the step contacts the rear of the firing pin guide. The firing pin guide cannot move backwards.

The stop allows all internal components to form a solid stack, wherein the internal elements are contacting each other, from tip of the pin assembly to the end cap. The forward pressure of the operator actuating the tool keeps the tip of the pin assembly pressed firmly against the substrate while the firing pin impacts the load.

Correct rotational alignment between the outer cover sleeve and the generally tubular trigger body is assured by a radial tongue or key on one part engaging a complementary groove or keyway in the other part.

DETAILED DESCRIPTION OF THE INVENTION

Figure 1:
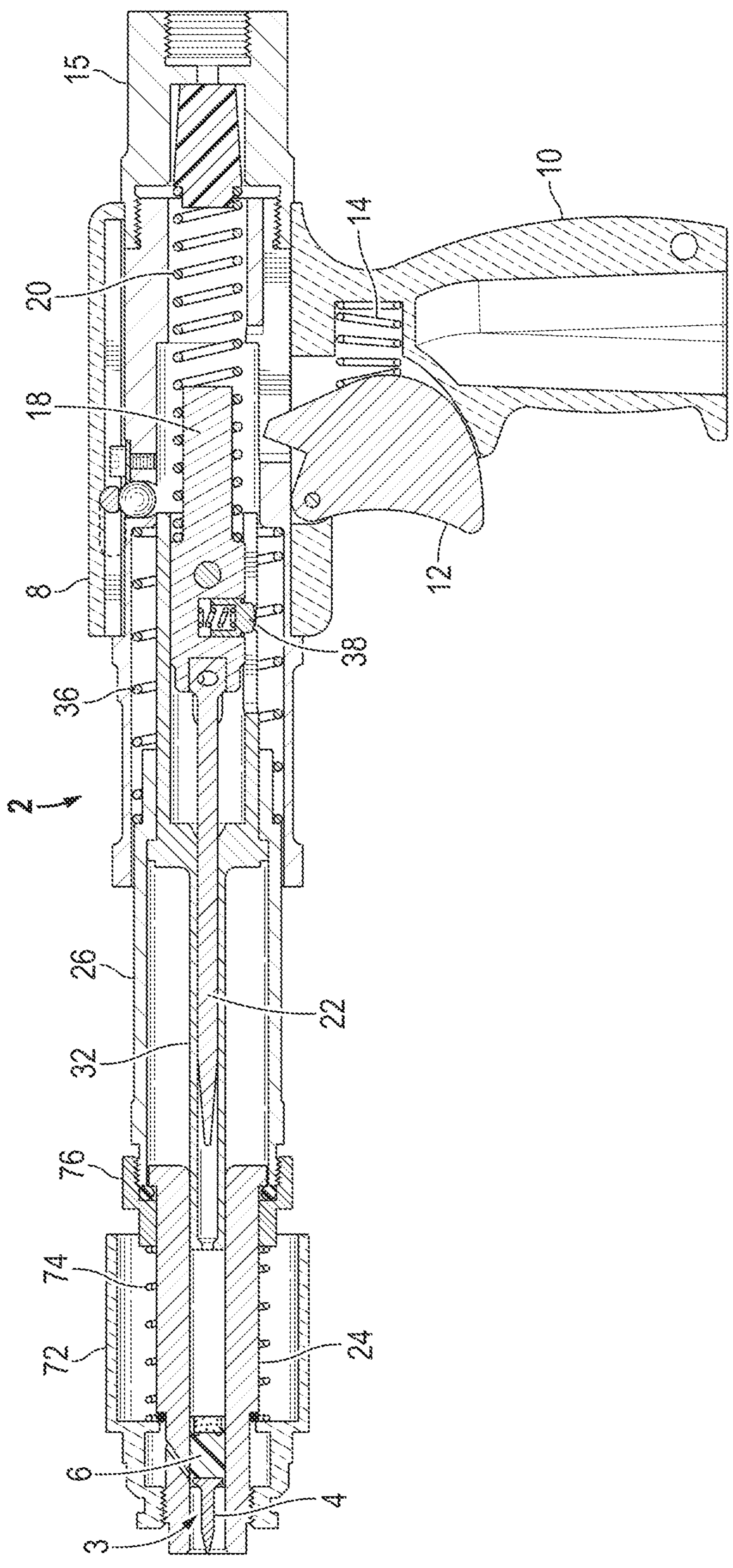
FIG. 1 is a longitudinal sectional view of a tool according to a first embodiment of the invention with the springs in unenergized states. The tool carries a fastener assembly comprising a nail and an explosive charge in its nosepiece.
Figure 2:
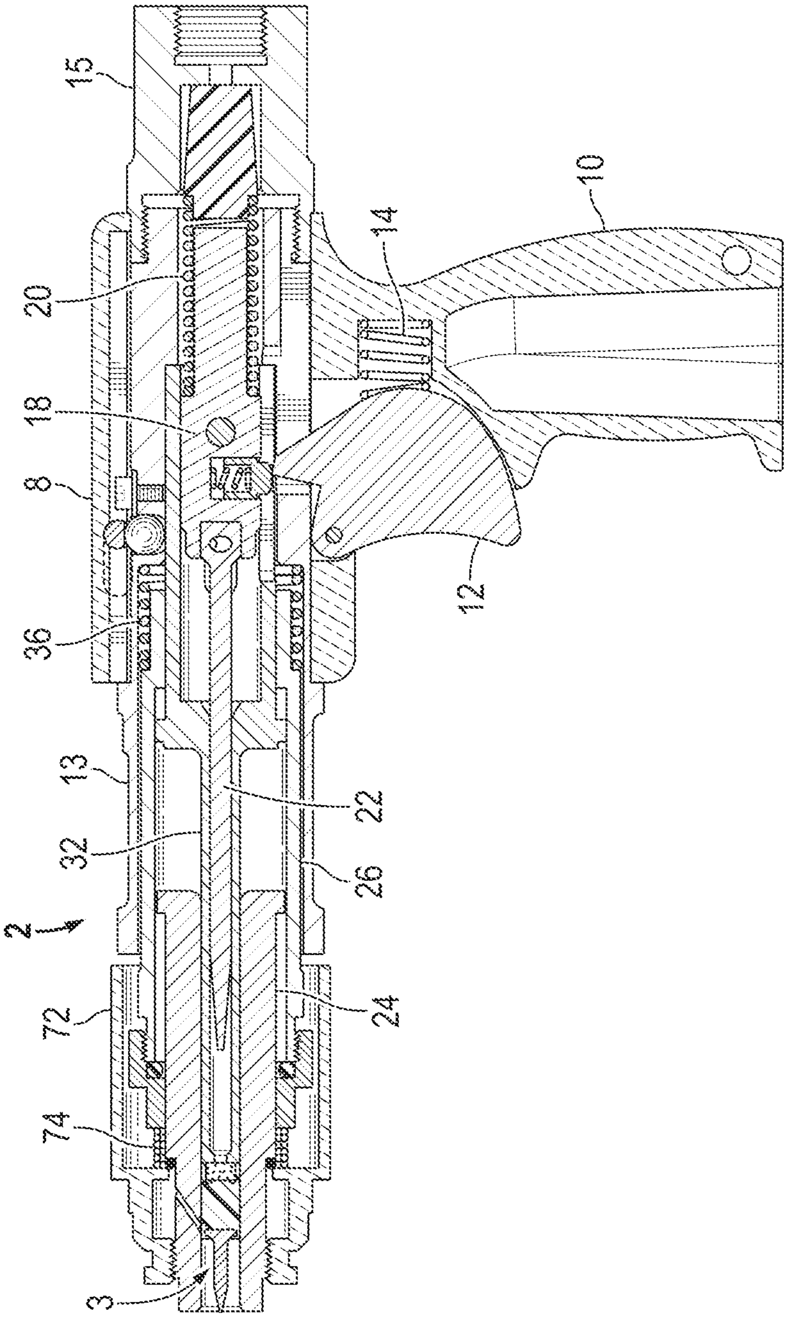
FIG. 2 is a longitudinal sectional view of the tool in FIG. 1 with the springs in an energized state. Internal components of the tool form a solid stack, from tip of the pin assembly to the end cap. By solid is meant that the solid components are contacting each other.
Figure 3:
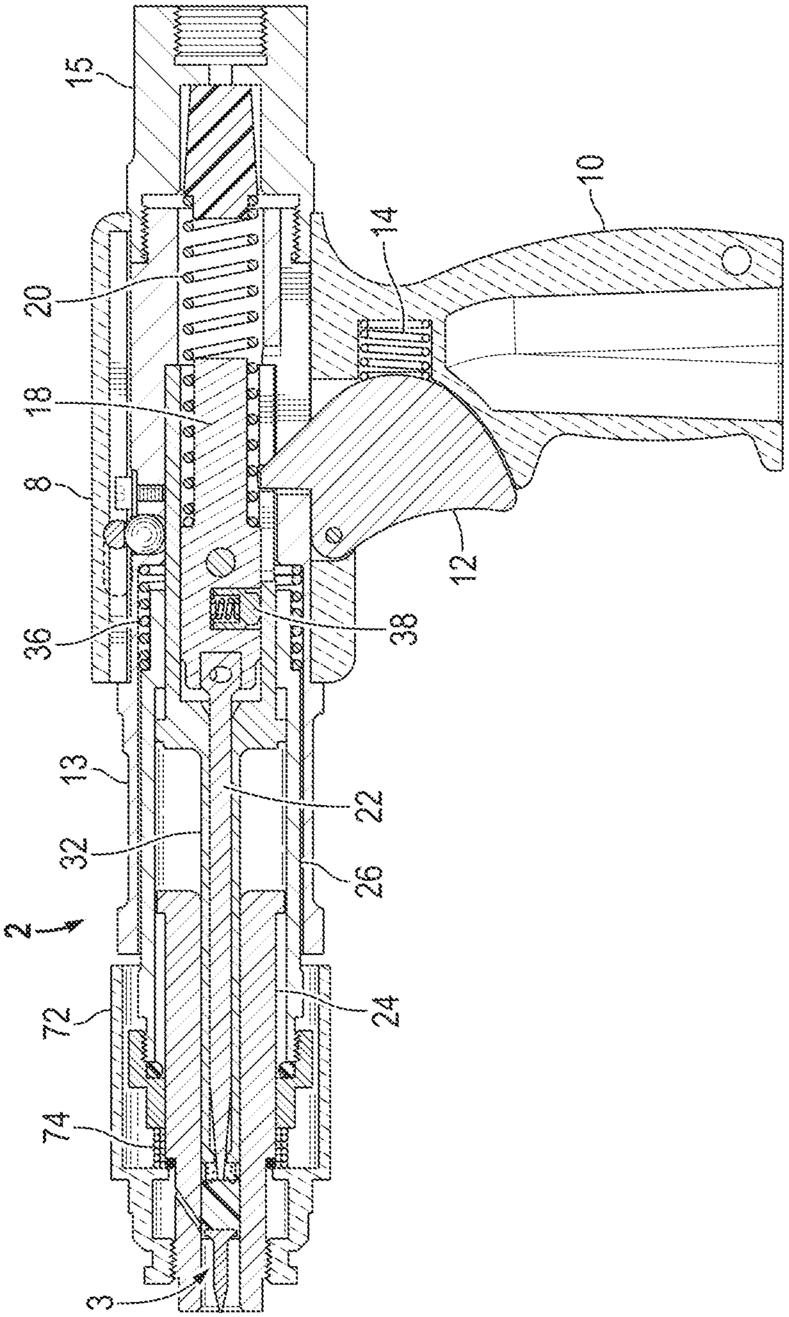
FIG. 3 is a longitudinal sectional view of the tool in FIGS. 1 and 2 after release of the firing pin to strike the explosive charge.

In the drawings, like parts in different equipment are called out by the same callout numerals.

Preferred embodiments of the invention provide tools 2, 102 for installing an explosively driven fastener 3, the fastener including a nail 4 and an explosive load 6 attached to the nail.

The tool comprises an outer cover sleeve 8, 108 defining a bore, a longitudinal axis, a proximal end and a distal end. A generally tubular trigger body 13 is fixedly positioned in the outer cover sleeve. The bore of the trigger body has a distally facing arcuate backstop face 11, 111, preferably a generally annular face.

An end cap 15, 115 is positioned at the proximal end of the trigger body securing the trigger body to the outer cover sleeve.

A firing pin holder 18 is located within the bore of the generally tubular trigger body and extends along the longitudinal axis of the trigger body. The firing pin holder has a proximal end and a distal end.

A firing spring 20 is arranged to bias the firing pin holder distally with respect to the trigger body.

A firing pin 22 is provided having a proximal end and a distal end. The distal end is pointed. The firing pin is separate from the firing pin holder. The proximal end of the firing pin is removably coupled to the distal end of the firing pin holder.

A nosepiece 24, 124 is provided having a proximal end and a distal end. The proximal end is arranged to receive a firing pin guide 32 and the distal end is arranged to receive the fastener comprising the nail and the explosive load such that when the fastener is placed in the distal end of the nosepiece and the firing pin holder is biased out of the outer cover sleeve by the firing spring, the firing pin strikes the explosive load causing the explosive load to explode and drive the nail out of the nosepiece.

A tubular reset sleeve 26 is provided having an inner arcuate face 28 facing distally and an outer arcuate face 30 facing proximally.

The firing pin guide is carried slidably in the reset sleeve. The firing pin guide has a distal end and a proximal end, a proximally facing outer arcuate face 34 abuttable against the inner arcuate face of the reset sleeve, and an annular face at its proximal end abuttable against the inside distally facing arcuate backstop face in the generally tubular trigger body.

A reset spring 36 is mounted around the firing pin guide and abuts the outer arcuate face of the reset sleeve. The reset spring biases the reset sleeve distally.

A trigger ball 38 and a trigger ball spring 40 are mounted transversely in the firing pin holder. The trigger ball is biased radially outward from within the firing pin holder.

The firing pin guide has a slot 50 extending from the proximal end and a widened area 52 in the slot to receive the trigger ball.

When the tool is in an energized position, the trigger ball rests in the widened area of the slot thereby limiting distal movement of the firing pin, and the arcuate preferably annular end face of the firing pin guide abuts or nearly abuts the arcuate preferably annular backstop face in the trigger body.

Figure 8:
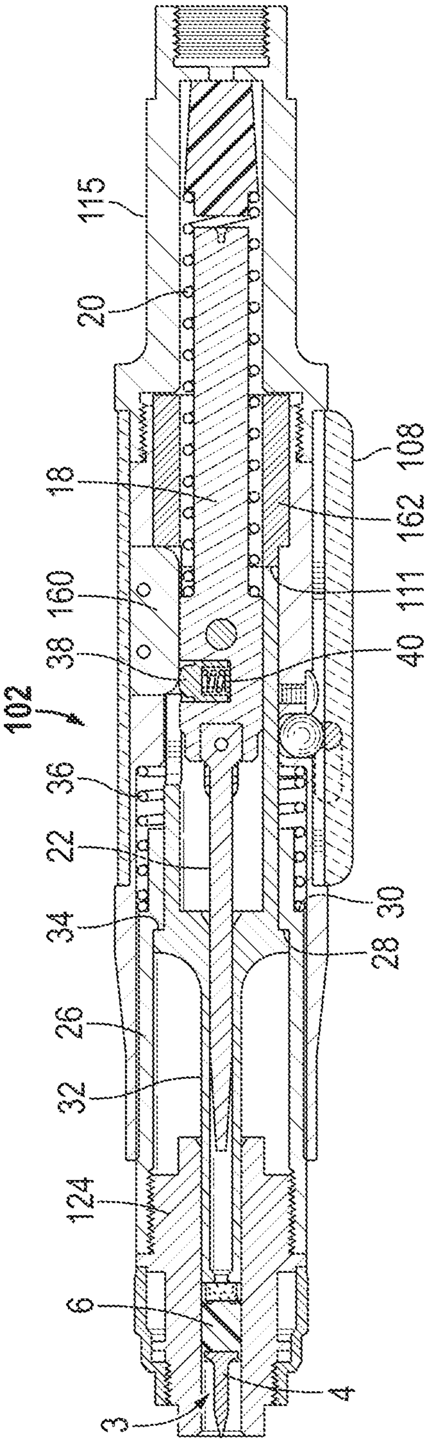
FIG. 8 is a longitudinal sectional view of a tool according to a second embodiment of the invention with the springs in energized states.
Figure 9:
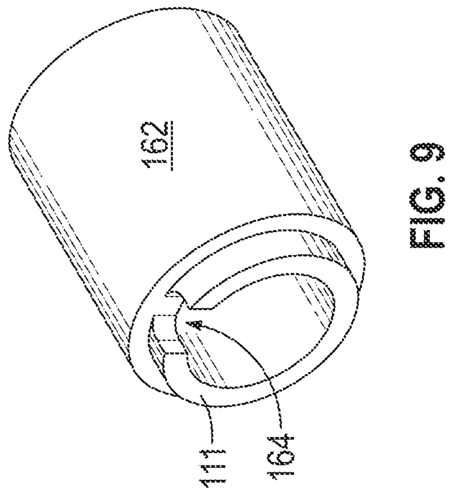
FIG. 9 is a pictorial illustration of a part shown in FIG. 8 showing additional features.

In one embodiment of the invention, (FIG. 8), an internal trigger shoe 160 extends radially inwardly into the bore of the trigger body at a distal location from the distally facing arcuate backstop face. The shoe is receivable by the keyway to depress the trigger ball by sliding over it. When the tool is in a firing position, the trigger shoe depresses the trigger ball out of engagement with the firing pin guide allowing distal movement of the firing pin under the action of the firing spring as the arcuate end face of the firing pin guide abuts the arcuate backstop face in the trigger body. In one embodiment, the distally facing arcuate backstop face is an end face of a tubular backstop 162 carried internally at the proximal end of the trigger body. The backstop in the tool can thus be a separate or an integral part. If needed for proper stack height, the arcuate backstop face of tubular backstop can define a notch 164 to partially accommodate the trigger shoe. The tubular backstop can be press fitted into the trigger body. The overall stack length can be adjusted, if necessary, by placing spacer(s), for example, washer(s), between the nosepiece and the reset sleeve.

In one embodiment of the invention, a grip 10 extends transversely from the outer cover sleeve between the proximal end and the distal end. A trigger 12 is pivotally connected to the outer cover sleeve and biased distally away from the grip by a trigger spring 14 positioned between the grip and the trigger. The trigger has an upper surface and a nose 16 protruding from its upper surface toward the longitudinal axis of the outer cover sleeve. The nose enters the bore of the outer cover sleeve when the trigger is depressed toward the grip. The generally tubular trigger body defines a longitudinally extending slot 70 which receives the nose of the trigger when the trigger is depressed toward the grip. When the tool is in a firing position, the trigger nose depresses the trigger ball out of engagement with the firing pin guide to allow distal movement of the firing pin under the action of the firing spring.

In one embodiment of the invention, the distally facing arcuate backstop face of the generally tubular trigger body comprises an annular step in the bore of the trigger body and is unitary with the trigger body.

One embodiment of the invention further comprises a blocking element 41 carried for radial movement by generally tubular trigger body to selectively block proximal movement of the firing pin guide and prevent energization of the firing pin spring. A cam 42 is mounted across the outer cover sleeve, and an arm is positioned on one end of the cam to permit about a 90 degree rotation of the cam to selectively block radially outward movement of the blocking element and prevent the firing pin guide from moving sufficiently proximally for the firing pin spring to be energized. The safety is preferably a ball bearing that contacts the distal end of the firing pin holder.

Figure 4:
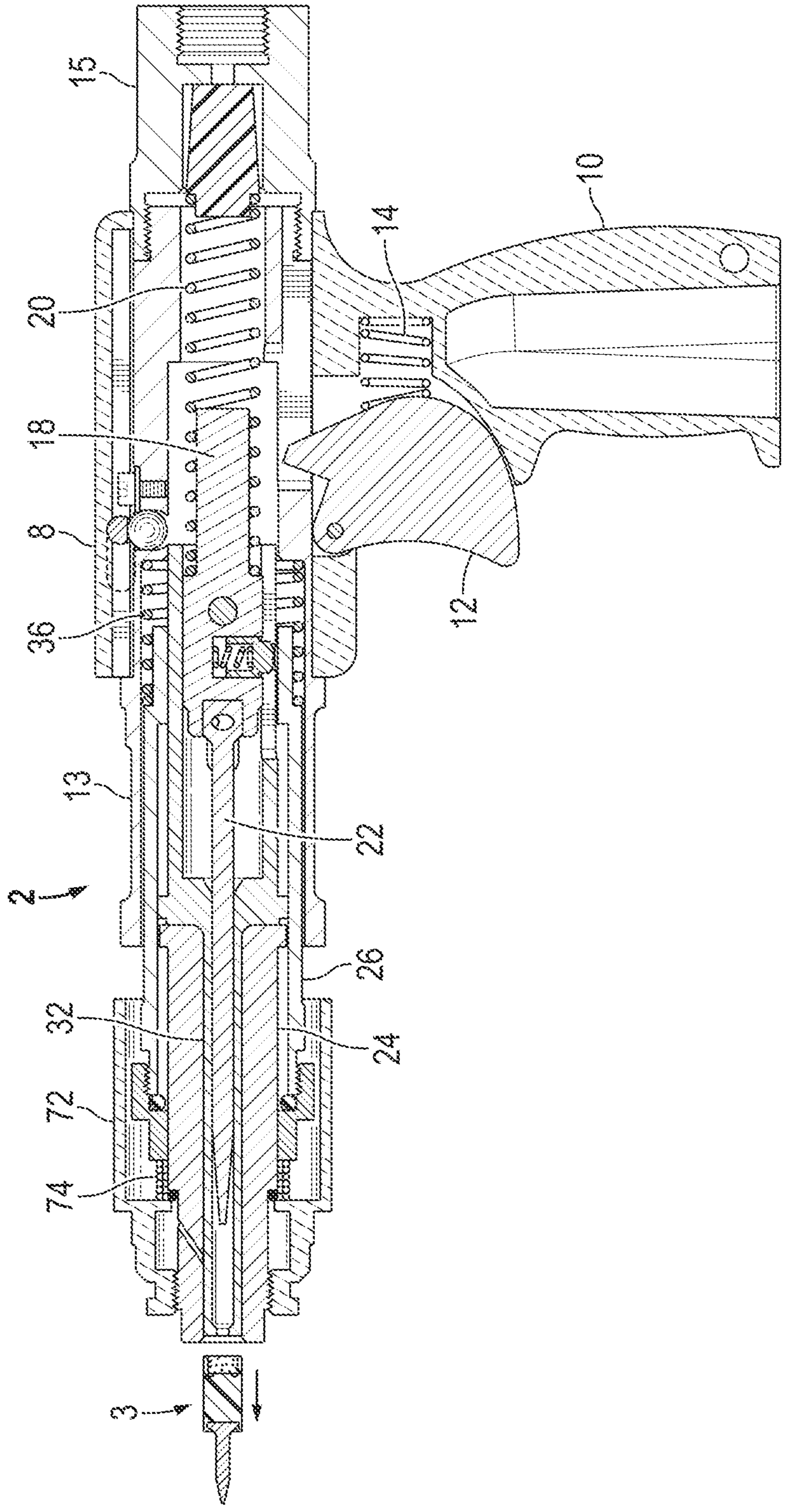
FIG. 4 is a longitudinal sectional view of the tool as shown in FIGS. 1-3 showing ridding the nosepiece of a fastener assembly in the event of misfire or change of mind.
Figure 5:
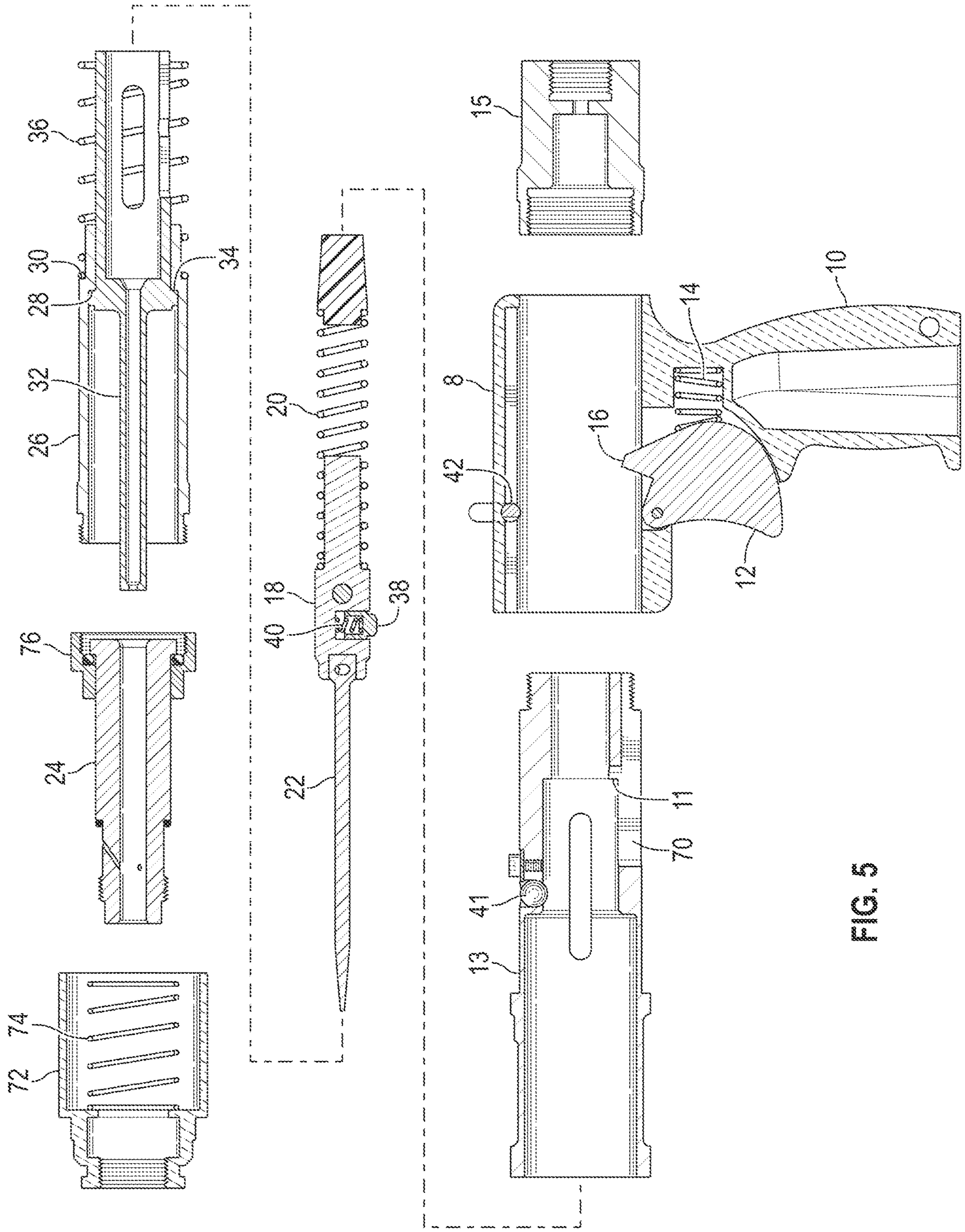
FIG. 5 is an exploded view of the tool of FIGS. 1-4.
Figure 7:
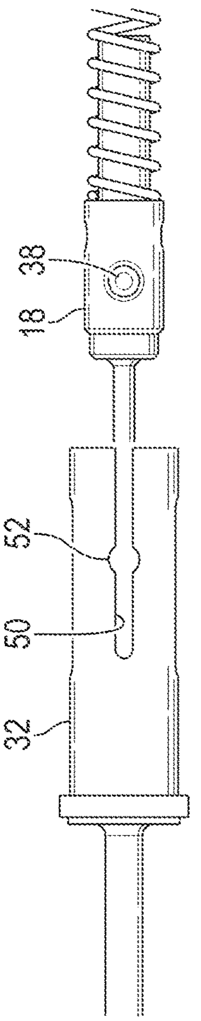
FIG. 7 is a pictorial illustration of some of the parts shown in FIG. 5 illustrating how they go together in greater detail and from another angle.
Figure 6:
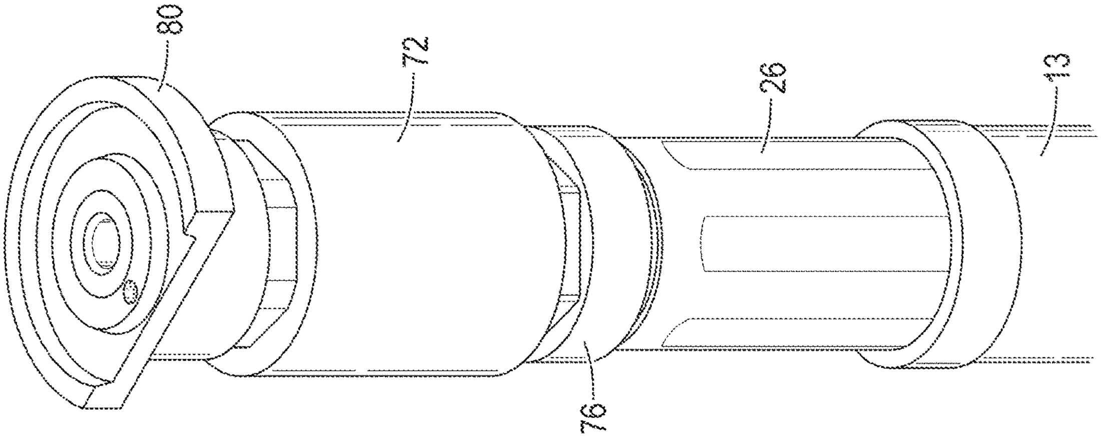
FIG. 6 is a pictorial illustration of an optional feature that can be utilized with the tool of FIGS. 1-5.

In one embodiment of the invention, a tubular debris cup 72 is attached to the nosepiece in a covering coaxial relationship. A threaded reset sleeve cap 76 is positioned on the distal end of the reset sleeve and retains the proximal end of the nosepiece against the distal end of the reset sleeve. A nosepiece spring 74 is positioned between the debris cup and the reset sleeve cap annularly to the nosepiece urging the debris cup distally from the reset sleeve cap and extending the nosepiece to its full distal position. The tubular debris cup rides over the reset sleeve cap and the reset sleeve when the nosepiece spring is compressed. The outer cover sleeve rides over the reset sleeve when the reset sleeve spring is compressed. Compression of the nosepiece spring and the reset sleeve spring brings the distal end of the firing pin guide to a position adjacent the distal end of the nosepiece. See FIG. 4 which shows an unfired fastener assembly being ejected.

Figure 10:
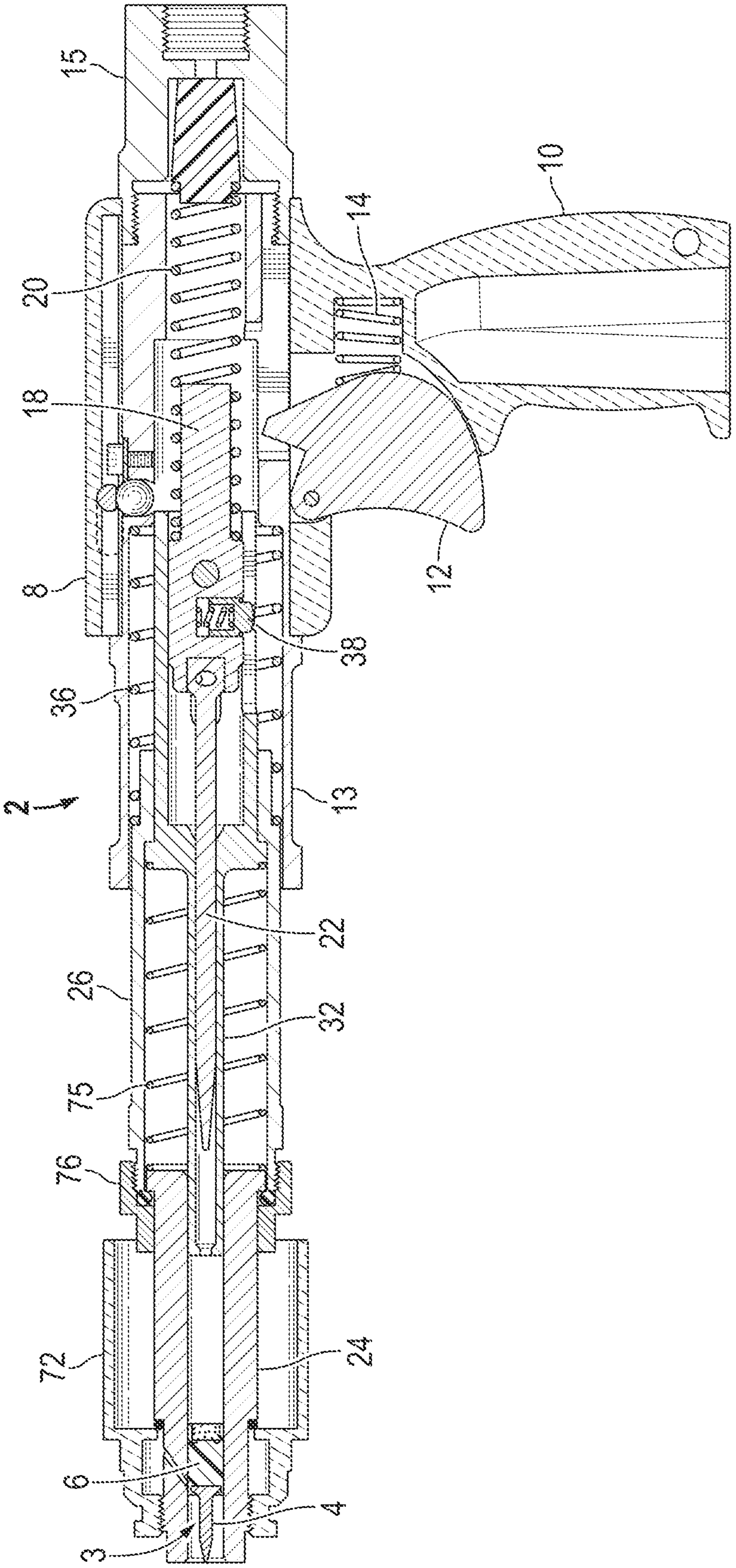
FIG. 10 is a tool as in FIG. 1 but with a modified spring arrangement.

FIG. 10 illustrates an alternative to nosepiece spring 74 in the form of a nosepiece spring 75 positioned between the distally facing annular face of the firing pin guide and the proximally facing annular face on the proximal end of the nosepiece. Springs 74 or 75 urge the nosepiece to the full distal position. Functionally, nosepiece Springs 74 or 75 can be viewed as biasing means for biasing the nosepiece to its fully distally extended position.

These features enable the tool to accept fastener assemblies from 1" to 2½" and be able to eject debris or an unfired fastener assembly and reset the tool properly. The nosepiece is no longer screwed into the reset sleeve. Instead, the nosepiece can travel freely on the firing pin guide and is connected to the reset sleeve by a new reset sleeve cap. The fastener assembly is inserted into the nosepiece. Then the operator will lightly compress the tool until the tip of the nail pushes against the substrate. The tip of the firing pin guide pushes against the charge holding the nail in place. A spring (added between the lip of the firing pin guide and the nosepiece, or between the extended debris cup and the reset spring cap) pushes the nosepiece to full extension. The modified nosepiece can travel into the body of the reset sleeve. During ejection, the nosepiece is first pushed into the reset sleeve reducing the total space inside the nosepiece to less than 40 mm, then the firing pin guide advances 40 mm fully ejecting any plastic or debris stuck inside the nosepiece.

For cocking, the firing pin is carried proximally with proximal movement of the firing pin guide to compress the firing pin spring until the firing pin is released from the firing pin guide.

In some embodiments, a spall shield 80 is mounted to the distal end of the nosepiece to provide greater worker safety for nail sets in concrete.

Figure 11:
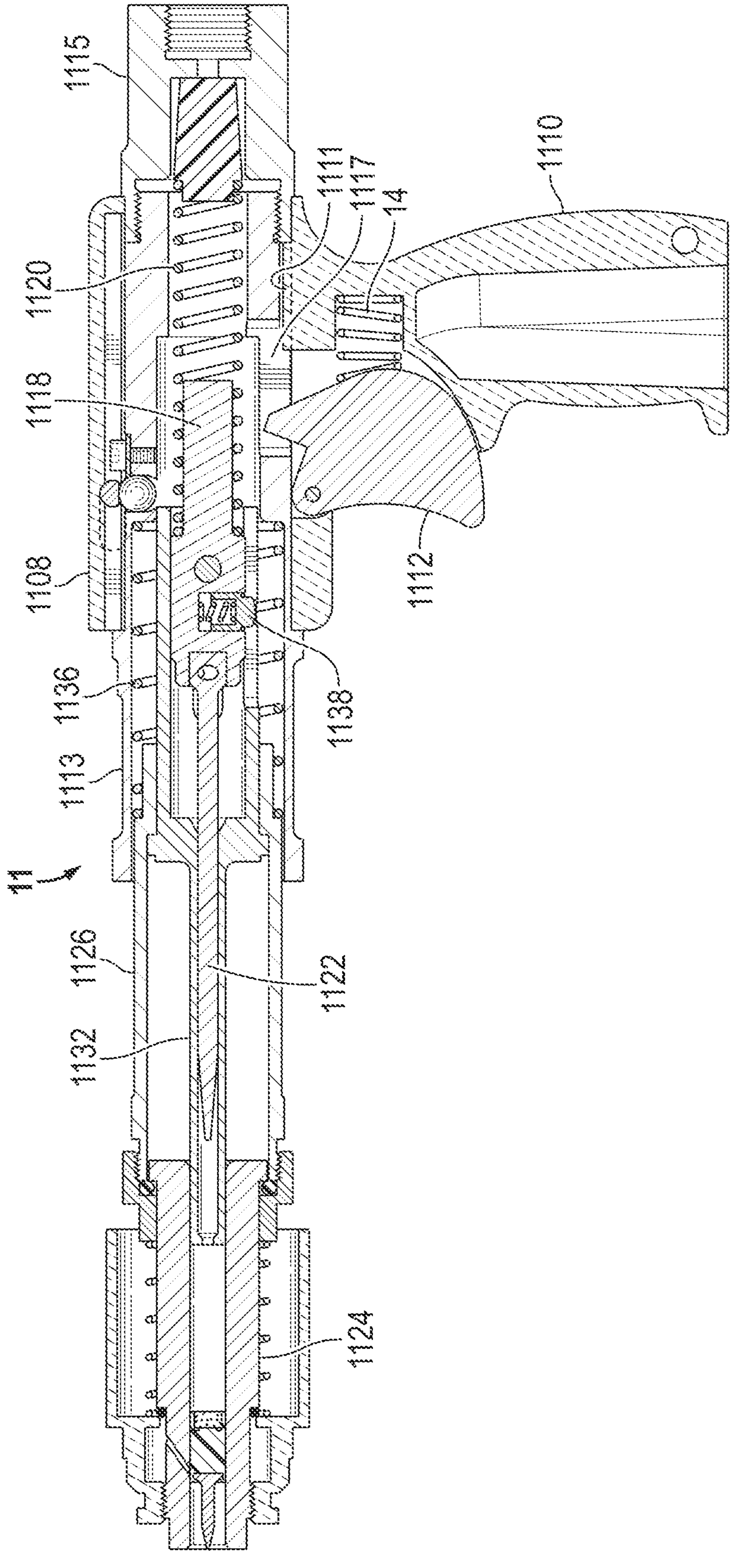
FIG. 11 is a longitudinal sectional view of a tool according to a third embodiment of the invention.
Figure 12:
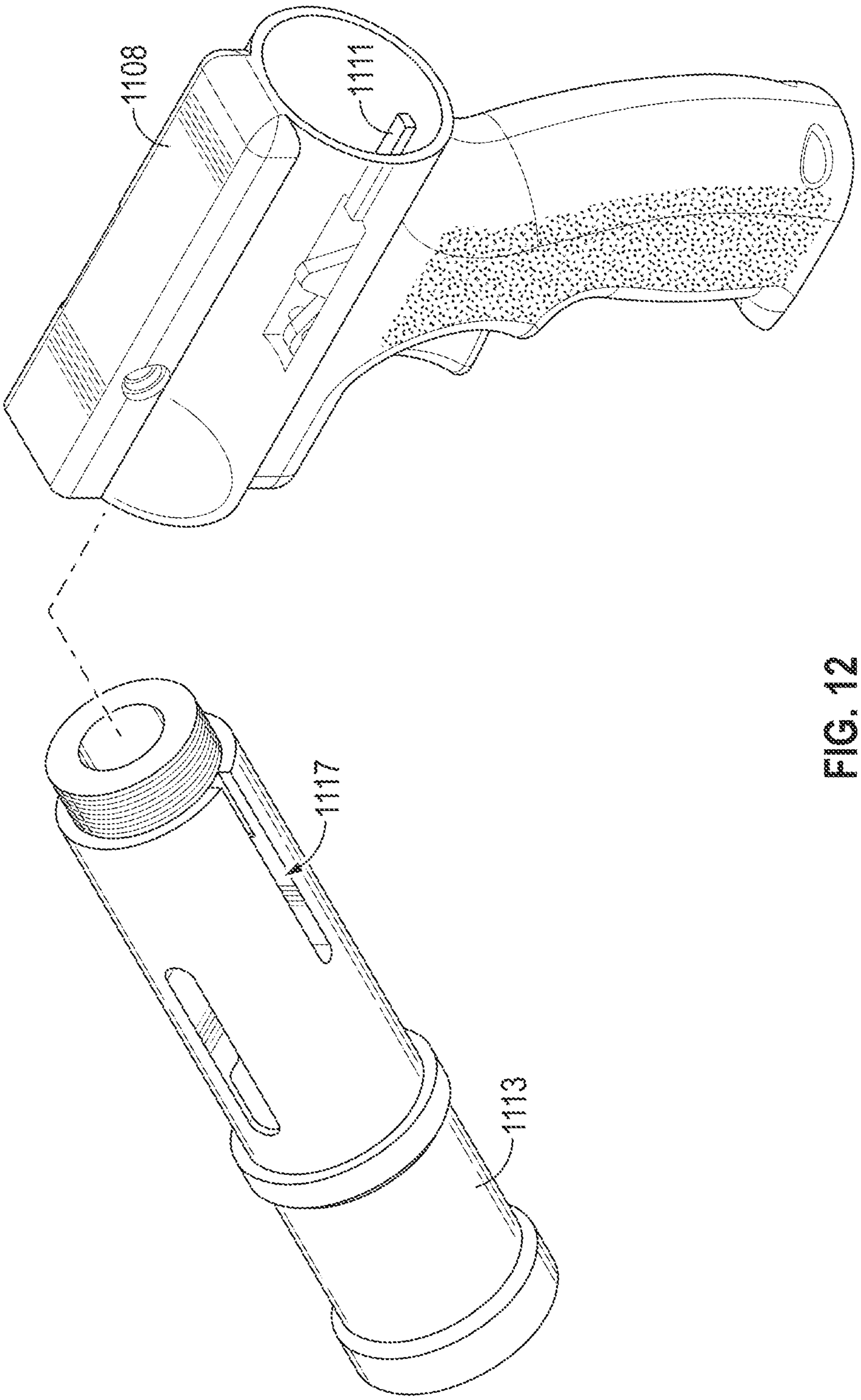
FIG. 12 is an exploded view of two of the parts shown in FIG. 11.

With reference to FIGS. 11 and 12, correct rotational alignment between the outer cover sleeve 1108 and the generally tubular trigger body 1113 during assembly is assured by a radial tongue or key on one part engaging a complementary groove or keyway in the other part. In other words, rotational positioning between the outer cover sleeve and the generally tubular trigger body is determined by a radial tongue or key on one of the outer cover sleeve and the generally tubular trigger body engaging a complementary groove or keyway in the other of the outer cover sleeve and the generally tubular trigger body. Because the generally tubular trigger body slides into the distal end of the outer cover sleeve during assembly, it is preferred that any radially outwardly extending tongue or key on the generally tubular trigger body engage a complementary groove or keyway near the distal end of the outer cover sleeve, and any radially inwardly extending tongue or key on the outer cover sleeve engage a complementary groove or keyway near the proximal end of the generally tubular trigger body. Although both ways of doing it are shown in the Figures, only one is needed.

With reference to FIG. 12, in a specific embodiment, a key 1111 protruding radially inward near the proximal end of the outer cover sleeve is received by a complementary keyway 1117 formed on the outer surface of the generally tubular trigger body at the proximal end. Engagement of the complementary parts during assembly assures correct rotational alignment between the generally tubular trigger body and the outer cover sleeve.

In FIG. 11, the tool comprises an outer cover sleeve 108 defining a bore, a longitudinal axis, a proximal end and a distal end. A generally tubular trigger body 1113 is fixedly positioned in the outer cover sleeve. The bore of the trigger body has a distally facing arcuate backstop face.

An end cap 1115 is positioned at the proximal end of the trigger body securing the trigger body to the outer cover sleeve.

A firing pin holder 1118 is located within the bore of the generally tubular trigger body and extends along the longitudinal axis of the trigger body. The firing pin holder has a proximal end and a distal end.

A firing spring 1120 is arranged to bias the firing pin holder distally with respect to the trigger body.

A firing pin 1122 is provided having a proximal end and a distal end. The distal end is pointed. The firing pin is separate from the firing pin holder. The proximal end of the firing pin is removably coupled to the distal end of the firing pin holder.

A nosepiece 1124 is provided having a proximal end and a distal end. The proximal end is arranged to receive a firing pin guide 1132 and the distal end is arranged to receive the fastener comprising the nail and the explosive load such that when the fastener is placed in the distal end of the nosepiece and the firing pin holder is biased out of the outer cover sleeve by the firing spring, the firing pin strikes the explosive load causing the explosive load to explode and drive the nail out of the nosepiece.

A tubular reset sleeve 1126 is provided having an inner arcuate face facing distally and an outer arcuate face facing proximally.

The firing pin guide is carried slidably in the reset sleeve. The firing pin guide has a distal end and a proximal end, a proximally facing outer arcuate face abuttable against the inner arcuate face of the reset sleeve, and an annular face at its proximal end abuttable against the inside distally facing arcuate backstop face in the generally tubular trigger body.

A reset spring 1136 is mounted around the firing pin guide and abuts the outer arcuate face of the reset sleeve. The reset spring biases the reset sleeve distally.

A trigger ball 1138 and a trigger ball spring are mounted transversely in the firing pin holder. The trigger ball is biased radially outward from within the firing pin holder.

The firing pin guide has a slot extending from the proximal end and a widened area in the slot to receive the trigger ball.

Correct rotational alignment between the outer cover sleeve 1108 and the generally tubular trigger body 1113 during assembly is assured by a radial tongue or key on one part engaging a complementary groove or keyway in the other part as hereinabove described.

In a preferred embodiment of the invention, a grip 1110 extends transversely from the outer cover sleeve between the proximal end and the distal end. A trigger 1112 is pivotally connected to the outer cover sleeve and biased distally away from the grip by a trigger spring 1114 positioned between the grip and the trigger. The trigger has an upper surface and a nose 1116 protruding from its upper surface toward the longitudinal axis of the outer cover sleeve. The nose enters the bore of the outer cover sleeve when the trigger is depressed toward the grip. The generally tubular trigger body defines a longitudinally extending slot 1170 (see FIG. 12) which receives the nose of the trigger when the trigger is depressed toward the grip. When the tool is in a firing position, the trigger nose depresses the trigger ball out of engagement with the firing pin guide to allow distal movement of the firing pin under the action of the firing spring.

Figure 13:
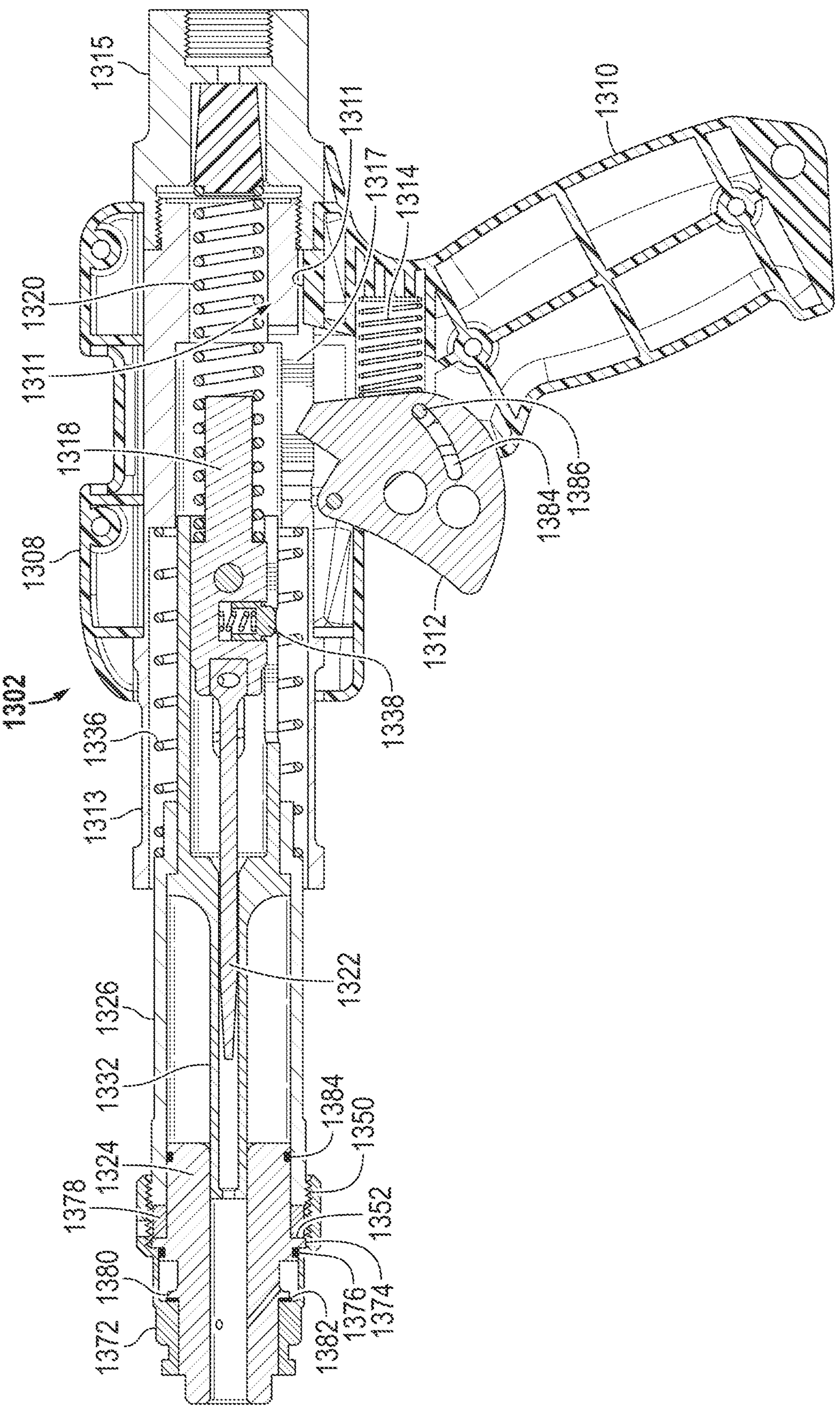
FIG. 13 is a longitudinal sectional view of another embodiment of the invention.
Figure 14:
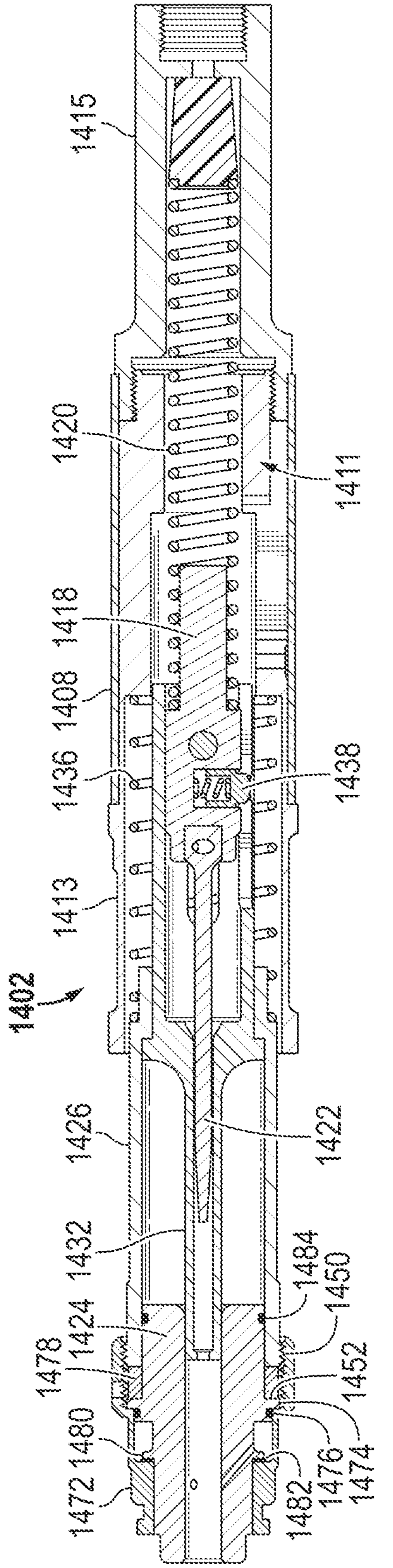
FIG. 14 is a longitudinal sectional view of another embodiment of the invention.

In the embodiments of the invention shown in FIGS. 13 and 14, there is depicted a tool 1302, 1402 for installing an explosively driven fastener, the fastener including a nail and an explosive load attached to the nail. The tool comprises an outer cover sleeve 1308, 1408 defining a passage, a longitudinal axis, a proximal end and a distal end. A generally tubular trigger body 1313, 1413 is fixedly positioned in the outer cover sleeve. The trigger body has a bore which defines a distally facing arcuate backstop face 1311, 1411. An end cap 1315, 1415 is positioned at the proximal end of the trigger body and secures the trigger body to the outer cover sleeve.

A firing pin holder 1318, 1418 is located within the bore of the generally tubular trigger body and extends along the longitudinal axis thereof. The firing pin holder has a proximal end and a distal end. A firing spring 1320, 1420 is arranged to bias the firing pin holder distally with respect to the trigger body. A firing pin 1322, 1422 is provided having a proximal end and a distal end. The distal end is pointed. The proximal end of the firing pin is removably coupled to the distal end of the firing pin holder. The firing pin is separate from the firing pin holder.

A tubular reset sleeve 1326, 1426 is carried by the trigger body. The tubular reset sleeve has a proximal end, a distal end, a longitudinal axis between the proximal end and the distal end, and a threaded outer surface 1350, 1450 near the distal end.

A nosepiece 1324, 1424 is provided having a proximal end and a distal end. The proximal end is received by the distal end of the tubular reset sleeve and is arranged to receive a firing pin guide 1332, 1432 and the distal end arranged to receive the fastener comprising the nail and the explosive load such that when the fastener is placed in the distal end of the nosepiece and the firing pin is biased out of the outer cover sleeve by the firing spring, the firing pin strikes the explosive load causing the explosive load to explode and drive the nail out of the nosepiece. The nosepiece has a proximally facing outside arcuate flange surface 1352, 1452 facing the distal end of the reset sleeve.

A tubular debris cup 1372, 1472 is positioned in covering coaxial relationship with the nosepiece. The tubular debris cup has a proximal end portion and a distal end. The distal end of the debris cup positioned in close covering relationship with a distal end portion of the nosepiece. The proximal end portion of the debris cup has a threaded inner surface threaded to the threaded external surface of the reset sleeve.

The firing pin guide is carried slidably in the reset sleeve. The firing pin guide has a distal end and a proximal end and a proximally facing outer arcuate face abuttable against the inner arcuate face of the reset sleeve. An arcuate face at the proximal end of the firing pin guide is abuttable against the inside distally facing arcuate backstop face in the generally tubular trigger body.

A reset spring 1336, 1436 is mounted around the firing pin guide and abuts the outer annular surface of the reset sleeve. The reset spring biases the reset sleeve distally.

A trigger ball 1338, 1438 and a trigger ball spring are mounted transversely in the firing pin holder. The trigger ball is biased radially outward from within the firing pin holder.

The firing pin guide has a slot extending from the proximal end and a widened area in the slot to receive the trigger ball.

When the tool is in an energized position, the trigger ball rests in the widened area of the slot thereby limiting distal movement of the firing pin, and the arcuate end face of the firing pin guide abuts or nearly abuts the arcuate backstop face in the trigger body.

In a preferred embodiment, the outside arcuate flange surface of the nosepiece that faces the distal end of the reset sleeve is formed by an annular flange 1374, 1474 further defining a distally facing annular face. The proximal end portion of the debris cup having the threaded inner surface threaded to the threaded external surface of the reset sleeve further forms a proximally facing inside annular face facing the distal end of the reset sleeve. An annular seal 1376, 1476 is mounted on an outside surface of the nosepiece adjacent to the distally facing annular face. An O-ring, preferably a Viton® O-ring, is suitable.

An annular spacer 1378, 1478 can be positioned between the proximally facing inside annular face of the debris cup and the distal end of the reset sleeve if needed to provide space in the bore for a particular fastener/charge combination. For example, a washer having a ¼ inch thickness can be used.

In one embodiment, the nosepiece further defines a second annular flange 1380, 1480 having a distally facing annular face and a proximally facing annular face.

The second annular flange is positioned between the annular flange and the distal end of the nosepiece. The debris cup further defines a second proximally facing inside annular face between the proximally facing annular flange face and the distal end of the debris cup. The second proximally facing inside annular face of the debris cup faces the distally facing face of the second annular flange of the nosepiece. A second annular seal 1382, 1482, for example, a Viton® O-ring, is sealingly positioned between the second proximally facing inside annular face of the debris cup and the distally facing face of the second annular flange of the nosepiece.

In one embodiment, the nosepiece has a generally cylindrical proximal end portion adjacent the proximal end closely received by the tubular reset sleeve. A third annular seal 1384, 1484, for example, a Viton® O-ring, is positioned on the generally cylindrical proximal end portion of the nosepiece and sealingly against the tubular reset sleeve.

Rotational positioning between the outer cover sleeve and the generally tubular trigger body can be determined by a radial tongue or key 1311, 1411 on one of the outer cover sleeve and the generally tubular trigger body engaging a complementary groove or keyway in the other of the outer cover sleeve and the generally tubular trigger body.

In the embodiment of the invention shown in FIG. 13, a grip 1310 extends transversely from the outer cover sleeve between the proximal end and the distal end of the cover sleeve. A trigger 1312 is pivotally connected to the outer cover sleeve and biased distally away from the grip by a trigger spring 1314 positioned between the grip and the trigger. The trigger having an upper surface and a nose protruding from its upper surface toward the longitudinal axis of the outer cover sleeve. The nose enters the bore of the outer cover sleeve when the trigger is depressed toward the grip. The generally tubular trigger body defines a longitudinally extending slot which receives the nose of the trigger when the trigger is depressed toward the grip, and when the tool is in a firing position, the trigger nose depresses the trigger ball out of engagement with the firing pin guide to allow distal movement of the firing pin under the action of the firing spring.

In a preferred embodiment, the grip extends from the longitudinal axis of the outer cover sleeve at a grip angle in the range of 15 to 20 degrees, for example, 18 degrees, from the perpendicular. The trigger defines an arcuate slot 1385 extending transversely through the trigger and a pin 1386 is affixed to the grip and extends through the slot to limit pivotal range of motion of the trigger. The outer cover sleeve and grip preferably have a plane of symmetry and comprise a first half and a second half separated by the plane of symmetry, said first half and said second half being shells of injection molded construction.

The embodiments shown in FIGS. 13 and 14 are different from earlier-described embodiments in that the thread is sealed off from combustion products by 3 O-rings. Especially when a coarse thread of short thread length is employed, the debris cup is easier to remove for service, and adjustment of overall length by inserting, changing or removing spacer(s) is facilitated. Further, the firing pin guide and outside-threaded reset sleeve are both lengthened to attain a total reset distance of 48 mm. The accommodates a wide range of fastener lengths, from ½ inch to 1¼ inches, without and with the use of a ¼ inch spacer, respectively, in addition to providing a firing spring compression distance of 40 mm from rest to the point of engagement with the backstop.

The embodiment shown in FIG. 13 differs from earlier-described trigger tools in that the grip angle is 18 degrees from the bore axis to provide a more natural wrist angle when compressing the tool for firing. An arc-shaped slot in the trigger with a fastener positioned through the slot limits the trigger's range of motion without plastic to plastic contact, which changes over time. The grip has also been split into two parts and shelled/ribbed for injection molding, The grip is also provided with a hole for lanyard retention and a housing area on the top of the tool for a bubble level.

Figure 16:
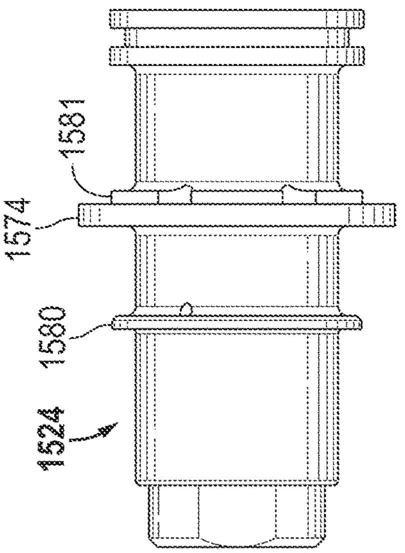
FIG. 16 is a side elevation view of the nosepiece shown in FIG. 15.
Figure 17:
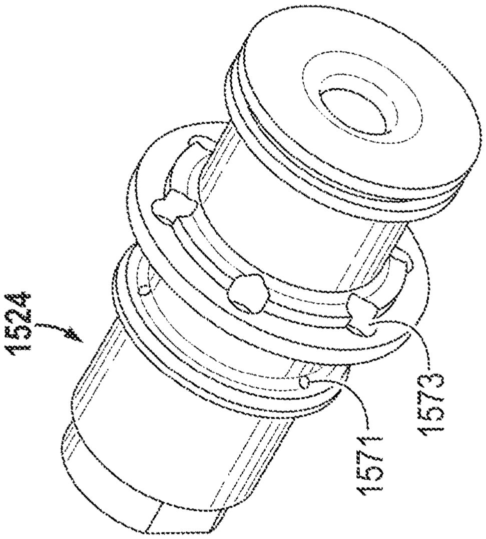
FIG. 17 is a pictorial view of the nosepiece shown in FIG. 16.
Figure 15:
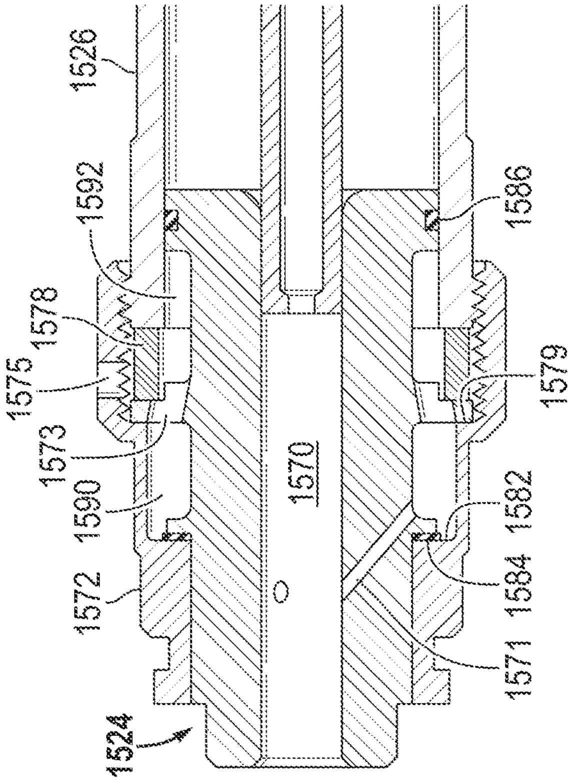
FIG. 15 is a longitudinal sectional view of a nosepiece mounted to the distal end of a tool according to another embodiment of the invention.

FIGS. 15-17 show an alternative embodiment of a nosepiece, 1524. The nosepiece 1524 has an axial bore 1570, and a first outer annular flange 1574 and a second outer annular flange 1580 positioned between its proximate and distal ends. The first annular flange 1574 has a circumferential step 1581 on its proximate face. The step mounts an annular spacer 1578 when present, otherwise, it locates the nosepiece on the distal end of a tubular reset sleeve, for example, 1526.

A tubular debris cup 1572 is positioned in covering coaxial relationship with the nosepiece. The tubular debris cup has a proximal end portion and a distal end. The distal end of the debris cup is positioned in close covering relationship with a distal end portion of the nosepiece. The proximal end portion of the debris cup has a first proximally facing inside annular face 1579 abutting the flange 1574 and a threaded inner surface threaded to the threaded external surface of the reset sleeve. A radial port 1575 can be provided through the sidewall of the debris cup near the threads to determine whether an annular spacer is present between the reset sleeve and the debris cup and if so, its color.

In the alternative embodiment, the nosepiece further defines a second annular flange 1580 having distally facing annular face and a proximally facing annular face. The second annular flange is positioned between the first annular flange and the distal end of the nosepiece. The debris cup further defines a second proximally facing inside annular face 1582 between the first proximally facing annular flange face and the distal end of the debris cup. The second proximally facing inside annular face of the debris cup faces the distally facing face of the second annular flange 1580 of the nosepiece and makes contact as the threads are taken up, urging the nosepiece proximally.

A first annular chamber 1590 is defined between the nosepiece and the debris cup on the distal side of the first annular flange 1574 and a second annular chamber 1592 is defined between the nosepiece and the tubular reset sleeve on the proximate side of the first annular flange 1574. A plurality of high-pressure gas ports 1571 connect the axial bore 1570 with the first annular chamber 1590. A plurality of low-pressure gas relief ports 1573 extend through the annular flange 1574 and connect the first annular chamber 1590 and the second annular chamber 1592. Annular seals 1584 and 1586 seal the distal and proximate ends of the annular chambers.

The nosepiece muffles the sound of the explosive charge.

While certain preferred embodiments of the invention have been described herein, the invention is not to be construed as being so limited, except to the extent that such limitations are found in the claims.

What is claimed is:

1. A tool for installing an explosively driven fastener, the fastener including a nail and an explosive load attached to the nail, the tool comprising:

an outer cover sleeve defining a bore, a longitudinal axis, a proximal end and a distal end;

a generally tubular trigger body fixedly positioned in the outer cover sleeve, a bore of the trigger body having a distally facing arcuate backstop face;

rotational positioning between the outer cover sleeve and the generally tubular trigger body being determined by a radial tongue or key on one of the outer cover sleeve and the generally tubular trigger body engaging a complementary groove or keyway in the other of the outer cover sleeve and the generally tubular trigger body;

an end cap positioned at a proximal end of the trigger body securing the trigger body to the outer cover sleeve;

a firing pin holder located within the bore of the generally tubular trigger body and extending along a longitudinal axis thereof, the firing pin holder having a proximal end and a distal end;

a firing spring arranged to bias the firing pin holder distally with respect to the trigger body;

a firing pin having a proximal end and a distal end, the distal end being pointed, the firing pin being separate from the firing pin holder, the proximal end of the firing pin being removably coupled to the distal end of the firing pin holder;

a nosepiece having a proximal end and a distal end, the proximal end arranged to receive a firing pin guide and the distal end arranged to receive the fastener comprising the nail and the explosive load such that when the fastener is placed in the distal end of the nosepiece and the firing pin is biased out of the outer cover sleeve by the firing spring, the firing pin strikes the explosive load causing the explosive load to explode and drive the nail out of the nosepiece, a nosepiece spring biasing the nosepiece distally, a tubular reset sleeve having an inner annular surface facing distally and an outer annular surface facing proximally, a firing pin guide, wherein the firing pin guide is carried slidably in the reset sleeve, the firing pin guide having a distal end and a proximal end, the firing pin guide having a proximally facing outer arcuate face between the distal end and the proximal end abuttable against an inner arcuate face of the reset sleeve, and an arcuate face at its proximal end abuttable against the distally facing arcuate backstop face in the generally tubular trigger body;

a reset spring mounted around the firing pin guide and abutting the outer annular surface of the reset sleeve, the reset spring biasing the reset sleeve distally;

a trigger ball and a trigger ball spring mounted transversely in the firing pin holder, the trigger ball being biased radially outward from within the firing pin holder;

wherein the firing pin guide has a slot extending from the proximal end and a widened area in the slot to receive the trigger ball, wherein when the tool is in an energized position, the trigger ball rests in the widened area of the slot thereby limiting distal movement of the firing pin, and the arcuate face at the proximal end of the firing pin guide abuts or nearly abuts the distally facing arcuate backstop face in the trigger body, said tool further comprising a grip extending transversely from the outer cover sleeve between the proximal end and the distal end, a trigger pivotally connected to the outer cover sleeve and biased distally away from the grip by a trigger spring positioned between the grip and the trigger, said trigger having an upper surface and a nose protruding from its upper surface toward the longitudinal axis of the outer cover sleeve, said nose entering the bore of the outer cover sleeve when the trigger is depressed toward the grip;

wherein the generally tubular trigger body defines a longitudinally extending slot which receives the nose of the trigger when the trigger is depressed toward the grip, and when the tool is in a firing position, the trigger nose depresses the trigger ball out of engagement with the firing pin guide to allow distal movement of the firing pin under the action of the firing spring, wherein a key protrudes radially inwardly from an inside surface of the bore from near the proximal end of the cover sleeve, and a complementary longitudinally extending keyway is defined on an outside surface of the generally tubular trigger body beginning at the proximal end of the trigger body, the key being received by the keyway to retain the trigger body in a fixed rotational position in the cover sleeve, and said nose of the trigger riding in the longitudinally extending keyway when the trigger is biased distally away from the grip.

2. A tool for installing an explosively driven fastener, the fastener including a nail and an explosive load attached to the nail, the tool comprising:

an outer cover sleeve defining a passage, a longitudinal axis, a proximal end and a distal end;

a generally tubular trigger body fixedly positioned in the outer cover sleeve, a bore of the trigger body having a distally facing arcuate backstop face;

an end cap positioned at a proximal end of the trigger body securing the trigger body to the outer cover sleeve;

a firing pin holder located within the bore of the generally tubular trigger body and extending along a longitudinal axis thereof, the firing pin holder having a proximal end and a distal end;

a firing spring arranged to bias the firing pin holder distally with respect to the trigger body;

a firing pin having a proximal end and a distal end, the distal end being pointed, the firing pin being separate from the firing pin holder, the proximal end of the firing pin being removably coupled to the distal end of the firing pin holder;

a tubular reset sleeve carried by the trigger body, said tubular reset sleeve having a proximal end, a distal end, a longitudinal axis between the proximal end and the distal end, and a threaded outer surface near the distal end, a nosepiece having a proximal end and a distal end, the proximal end being received by the distal end of the tubular reset sleeve and arranged to receive a firing pin guide and the distal end arranged to receive the fastener comprising the nail and the explosive load such that when the fastener is placed in the distal end of the nosepiece and the firing pin is biased out of the outer cover sleeve by the firing spring, the firing pin strikes the explosive load causing the explosive load to explode and drive the nail out of the nosepiece, said nosepiece having a proximally facing outside arcuate surface facing the distal end of the reset sleeve, a tubular debris cup positioned in covering coaxial relationship with the nosepiece, said tubular debris cup having a proximal end portion and a distal end, the distal end of the debris cup positioned in covering relationship with a distal end portion of the nosepiece, the proximal end portion of the debris cup having a threaded inner surface threaded to the threaded outer surface of the reset sleeve;

a firing pin guide, wherein the firing pin guide is carried slidably in the reset sleeve, the firing pin guide having a distal end and a proximal end, the firing pin guide having a proximally facing outer arcuate surface between the distal end and the proximal end abuttable against an inner arcuate surface of the reset sleeve, and an arcuate face at its proximal end abuttable against the distally facing arcuate backstop face in the generally tubular trigger body;

a reset spring mounted around the firing pin guide and abutting a proximally facing outer arcuate face of the reset sleeve, the reset spring biasing the reset sleeve distally;

a trigger ball and a trigger ball spring mounted transversely in the firing pin holder, the trigger ball being biased radially outward from within the firing pin holder;

wherein the firing pin guide has a slot extending from the proximal end and a widened area in the slot to receive the trigger ball, wherein when the tool is in an energized position, the trigger ball rests in the widened area of the slot thereby limiting distal movement of the firing pin, and the arcuate face at the proximal end of the firing pin guide abuts or nearly abuts the distally facing arcuate backstop face in the trigger body.

3. The tool as in claim 2 wherein the outside arcuate surface of the nosepiece that faces the distal end of the reset sleeve is formed by a first annular flange further defining a distally facing annular flange face, and the proximal end portion of the debris cup having the threaded inner surface threaded to the threaded outer surface of the reset sleeve further forms a proximally facing inside annular face facing the distal end of the reset sleeve; and said tool further comprises an annular seal mounted on an outside surface of the nosepiece adjacent to the distally facing annular flange face.

4. The tool as in claim 3 further comprising an annular spacer between the proximally facing inside annular face of the debris cup and the distal end of the reset sleeve.

5. The tool as in claim 3 wherein the nosepiece further defines a second annular flange having a distally facing face and a proximally facing face, said second annular flange positioned between the first annular flange and the distal end of the nosepiece, and the debris cup further defines a second proximally facing inside annular face between the proximally facing annular flange face and the distal end of the debris cup, said second proximally facing inside annular face of the debris cup facing the distally facing face of the second annular flange of the nosepiece, wherein the tool further comprises a second annular seal sealingly positioned between the second proximally facing inside flange face of the debris cup and the distally facing face of the second annular flange of the nosepiece.

6. The tool as in claim 5 wherein the nosepiece has a generally cylindrical proximal end portion adjacent the proximal end received by the tubular reset sleeve, said tool further comprising a third annular seal positioned on the generally cylindrical proximal end portion of the nosepiece sealingly against the tubular reset sleeve.

7. The tool as in claim 5 wherein the nosepiece further defines a third annular flange positioned at the proximate end of the nosepiece, a first annular chamber being defined between the nosepiece and the debris cup, and a second annular chamber being defined between the nosepiece and the reset sleeve, said apparatus further comprising an annular seal positioned between the third annular flange and the reset sleeve.

8. The tool as in claim 7 wherein the nosepiece further defines an axial bore and a plurality of gas depressurization ports extending between the axial bore and the first annular chamber.

9. The tool as in claim 8 wherein the nosepiece further defines a plurality of gas relief ports extending between the first annular chamber and the second annular chamber.

10. The tool as in claim 2 wherein rotational positioning between the outer cover sleeve and the generally tubular trigger body being determined by a radial tongue or key on one of the outer cover sleeve and the generally tubular trigger body engaging a complementary groove or keyway in the other of the outer cover sleeve and the generally tubular trigger body.

11. The tool as in claim 10 further comprising a grip extending transversely from the outer cover sleeve between the proximal end and the distal end, a trigger pivotally connected to the outer cover sleeve and biased distally away from the grip by a trigger spring positioned between the grip and the trigger, said trigger having an upper surface and a nose protruding from its upper surface toward the longitudinal axis of the outer cover sleeve, said nose entering the passage of the outer cover sleeve when the trigger is depressed toward the grip;

wherein the generally tubular trigger body defines a longitudinally extending slot which receives the nose of the trigger when the trigger is depressed toward the grip, and when the tool is in a firing position, the trigger nose depresses the trigger ball out of engagement with the firing pin guide to allow distal movement of the firing pin under the action of the firing spring.

12. The tool as in claim 11 wherein the grip extends from the longitudinal axis of the outer cover sleeve at a grip angle in the range of 15 to 20 degrees from the perpendicular to the longitudinal axis of the outer cover sleeve.

13. The tool as in claim 12 wherein the trigger defines an arcuate slot extending transversely through the trigger, said tool further comprising a pin affixed to the grip and extending through the slot to limit pivotal range of motion of the trigger.

14. The tool as in claim 13 wherein the outer cover sleeve and grip has a plane of symmetry and comprises a first half and a second half separated by the plane of symmetry, said first half and said second half being shells of injection molded construction.

* * * * *